(12) United States Patent
Rosenberger et al.

(10) Patent No.: US 11,595,457 B2
(45) Date of Patent: Feb. 28, 2023

(54) SYSTEM AND METHOD FOR DYNAMIC ADJUSTMENT OF CONTENT STREAMING RATES

(71) Applicant: ARRIS ENTERPRISES LLC, Suwanee, GA (US)

(72) Inventors: Aniela M. Rosenberger, Norristown, PA (US); William P. Franks, San Diego, CA (US); Kaliraj Kalaichelvan, San Diego, CA (US); Arpan Kumar Kaushal, San Diego, CA (US); Rajesh K. Rao, San Marcos, CA (US); Ernest George Schmitt, Maple Glen, PA (US)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

(21) Appl. No.: 17/669,031

(22) Filed: Feb. 10, 2022

(65) Prior Publication Data

US 2022/0321624 A1 Oct. 6, 2022

Related U.S. Application Data (60) Provisional application No. 63/170,702, filed on Apr. 5, 2021.

(51) Int. Cl.
| | |
|---|---|
| *H04L 65/613* | (2022.01) |
| *H04L 65/80* | (2022.01) |
| *H04L 65/1023* | (2022.01) |
| *H04L 65/60* | (2022.01) |

(52) U.S. Cl.
CPC ........ *H04L 65/613* (2022.05); *H04L 65/1023* (2013.01); *H04L 65/60* (2013.01); *H04L 65/80* (2013.01)

(58) Field of Classification Search
CPC ... H04L 65/613; H04L 65/1023; H04L 65/60; H04L 65/80
See application file for complete search history.

(56) References Cited

U.S. PATENT DOCUMENTS 5,926,834 A * 7/1999 Carlson ............... G06F 12/0866
711/135
6,189,080 B1 * 2/2001 Ofer ..................... G06F 12/0866
711/170

(Continued)

FOREIGN PATENT DOCUMENTS

| CN | 101924603 A | * 12/2010 | ........... H04L 1/0002 |
| CN | 108292970 A | * 7/2018 | ........... H04L 1/0002 |

(Continued)

*Primary Examiner* — Oanh Duong
(74) *Attorney, Agent, or Firm* — Botos Churchill IP Law LLP (57) ABSTRACT

A system and method dynamically adjusting the rate at which incoming content data is transferred into a media gateway appliance, and the rate at which outgoing content data is provided to one or more client devices by the media gateway appliance. This dynamic adjustment is performed in accordance with a predetermined program and as a function of real-time data streaming rates and predetermined rate parameters and preferences. The system and method enable the provision of an improved viewing and content acquisition experience for users.

20 Claims, 5 Drawing Sheets

(56) References Cited

U.S. PATENT DOCUMENTS

| | | | | |
|---|---|---|---|---|
| 6,622,206 | B1 * | 9/2003 | Kanamaru | G06F 12/0866 |
| | | | | 711/201 |
| 2008/0010410 | A1 * | 1/2008 | Zilbershtein | H04L 67/5682 |
| | | | | 711/118 |
| 2013/0282984 | A1 * | 10/2013 | Bi | G06F 12/0806 |
| | | | | 711/126 |
| 2015/0022917 | A1 * | 1/2015 | Ashida | G06F 3/0686 |
| | | | | 360/51 |
| 2021/0185142 | A1 * | 6/2021 | Paduroiu | H04L 65/60 |

FOREIGN PATENT DOCUMENTS

| | | | | |
|---|---|---|---|---|
| WO | WO-9418771 | A1 * | 8/1994 | H04L 29/06 |
| WO | WO-2014170791 | A2 * | 10/2014 | G06F 11/00 |
| WO | WO-2018234941 | A1 * | 12/2018 | G06F 9/4881 |

* cited by examiner

SYSTEM AND METHOD FOR DYNAMIC ADJUSTMENT OF CONTENT STREAMING RATES

CROSS-REFERENCE TO RELATED APPLICATION

This application claims the benefit of U.S. Provisional Patent Application No. 63/170,702, filed Apr. 5, 2021, which is incorporated by reference herein in its entirety.

BACKGROUND OF THE INVENTION

With the increased availability of residential broadband delivery of digital video content and the ever-growing number and variety of digital video content sources, consumers are storing more content than ever on digital video recorders ("DVRs"). These devices, often integrated into set-top boxes, offer consumers a convenient means of capturing one or more live streams of digital content for later and/or repeated viewing.

Unfortunately, the increased availability of digital video has led to a situation where the demands upon a given content repository, such as a DVR, may exceed the capabilities of the storage device or devices associated with such an appliance. For example, a single DVR appliance may have more than one user making demands for the retrieval of content, and therefore placing demands upon the DVR storage device (typically a hard disk drive) to output multiple high-density data streams that may exceed the device's ability to do so. In addition, the same storage device may simultaneously need to accommodate the storage of one or more incoming content streams. This could result in conflicts between the read and write processes to the memory device, further reducing the overall rate of data both to and from the device. Some of the problems alluded to above can be remediated through the use of queues and caches utilized as buffers to the disk-based storage within a DVR, but the capacity, and therefore the utility, of such of buffering has its limits.

Consequently, there exists a need for a system and method supporting an adaptive means of storing and retrieving data from a media storage device. Such a means would ideally adapt the rate at which data is written to and retrieved from a storage device as a function of media and system characteristics, such as the type and rate of the data source, the needs of the user or users consuming the data, and the paths available for data transmission.

BRIEF SUMMARY OF THE INVENTION

A system and method dynamically adjusting the rate at which incoming content data is transferred into a media gateway appliance, and the rate at which outgoing content data is provided to one or more client devices by the media gateway appliance. This dynamic adjustment is performed in accordance with a predetermined program and as a function of real-time data streaming rates and predetermined rate parameters and preferences. The system and method enable the provision of an improved viewing and content acquisition experience for users.

BRIEF DESCRIPTION OF THE DRAWINGS

The aspects, and advantages of the present invention will become better understood with regard to the following description, appended claims, and accompanying drawings in which:

DETAILED DESCRIPTION

Figure 1:
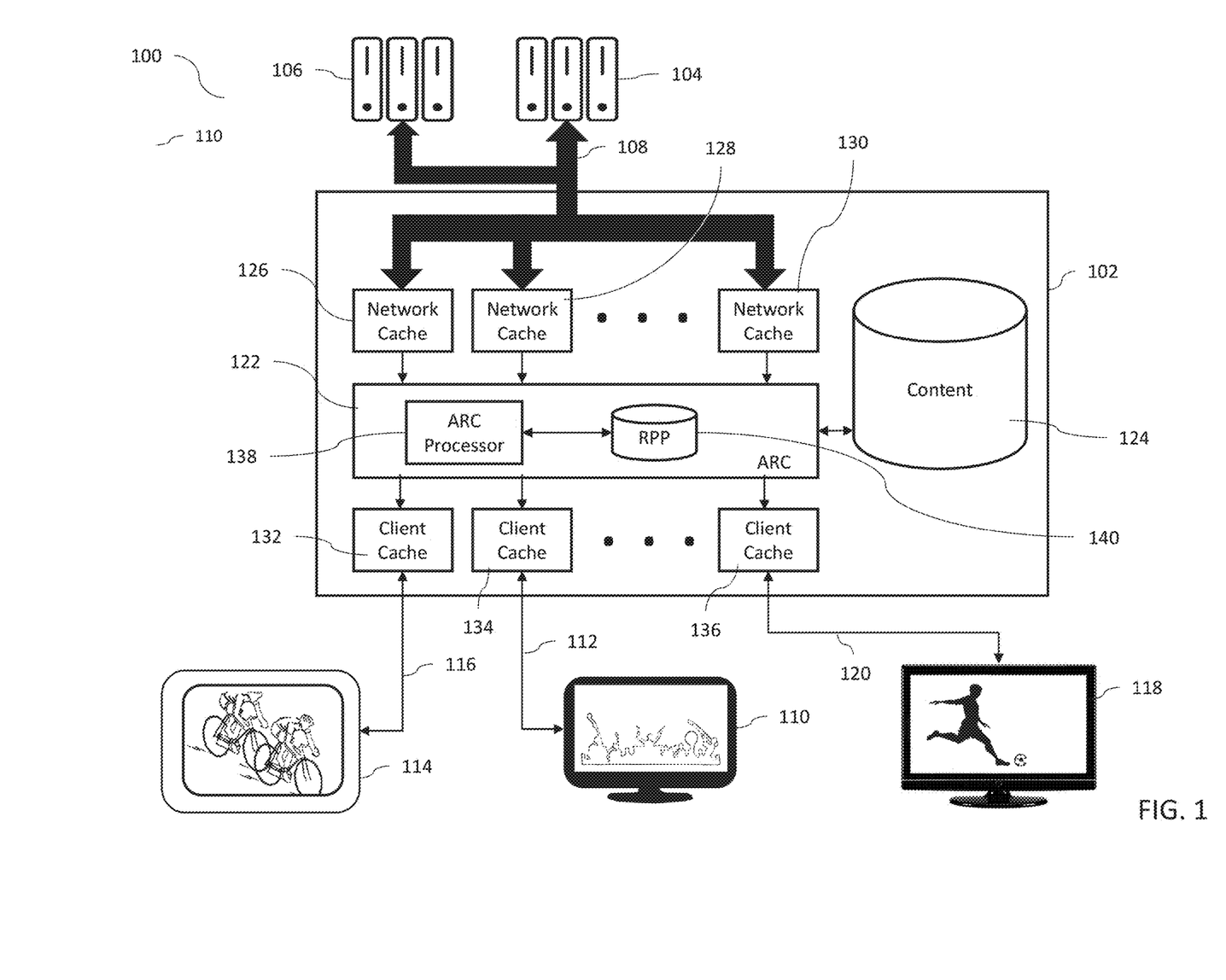
FIG. 1 is a functional block diagram of a system supporting the dynamic adjustment incoming and outgoing content streaming rates to and from an MGA.

FIG. 1 provides a functional block diagram of system 100 which supports the storage and retrieval of video content. As shown, the system includes media gateway appliance ("MGA") 102 which is linked to a first content delivery network ("CDN") 104 and a CDN (106) via broadband network 108. The CDNs could be any remote source of video content such as an Internet streaming service or a multi-service operator ("MSO") headend. Broadband network 108 can be a wired or wireless network capable of supporting broadband, bidirectional communications between MGA 102 and the CDNs. MGA 102 is also shown to be linked to digital television ("DTV") 110 via interface 112, to tablet 114 via interface 116, and to DTV 118 via interface 120. Interfaces 112, 116 and 120 can be each be supported by a wired connection, such as a coaxial cable or high-definition media interface ("HDMI") link, or by a wireless connection, such as a local wireless network (Wi-Fi, 802.11, etc.).

MGA 102, which is adapted to provide digital video recording ("DVR") functionality, is shown to include ARC Processor 122 and content memory 124. The ARC Processor can comprise one or more processers. Content memory 124 could be a hard disk drive ("HDD"), a solid-state drive ("SSD"), or any other type of digital storage media having a sufficient capacity for the storage of digital video content data, including cloud-based storage. The storage to content memory 124 must be facilitated so as support the rate (or rates) and types of content being received via broadband network 108, as well as the data rate(s) required for the provision of content to client devices (DTV 110, tablet 114 and DTV 118).

MGA 102 is also shown to include network caches 126, 128 and 130. Each of these caches is a defined region of random-access memory ("RAM") (either an entire discrete memory device or a designated portion of such a device) that serves as a buffer for video data received via broadband network 108. Client caches 132, 134 and 136 are also shown. These caches are each a defined region of random-access memory (either an entire discrete memory device or a designated portion of such a device) that serves as a buffer for video data destined for display upon DTV 110, tablet 114 or DTV 118 (collectively referred to as client devices). In addition, ARC 122 is shown to include ARC Processor 138 and memory 140. Memory 140 contains RPP data that is utilized by ARC Processor 138 so as to adaptively adjust the rate of data incoming and outgoing from MGA 102.

Figure 2:
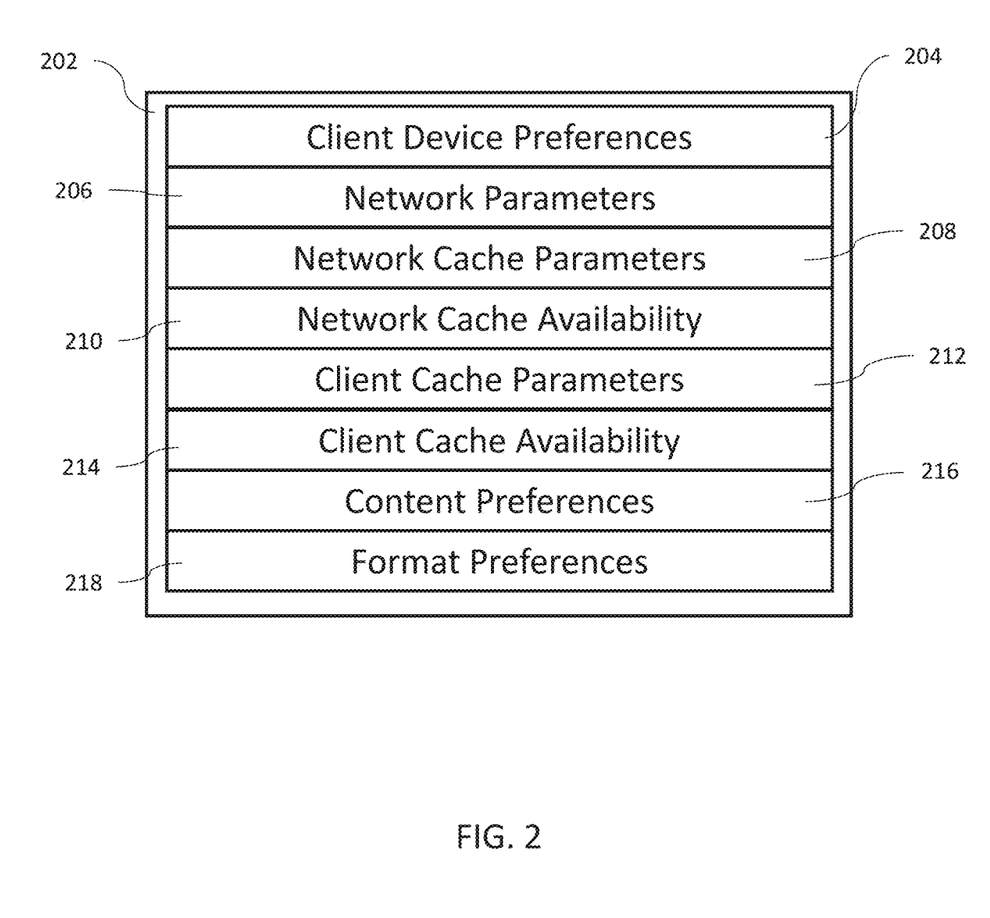
FIG. 2 is a graphical representation of Rate Parameters and Preferences ("RPP") data that utilized within the system of FIG. 1.

FIG. 2 provides a representation of some of the types of RPP data (202) can be stored within memory 140. This stored RPP data includes:

Client Device Preferences (204);
Network Parameters (206);
Network Cache Parameters (208);
Network Cache Availability (210);
Client Cache Parameters (212);
Client Cache Availability (214);
Content Preferences (216); and
Format Preferences (218).

The information for the preferences and parameters in the RPP memory 140 can be obtained by MGA 102 from client devices (for example, a given client device could provide information indicative of the type or types of format it was capable of displaying), or provided by user input (a particular user may desire to have sports programs provided in a high-definition format and news programs in standard definition), or by an MSO (the MSO may define the maximum bandwidth supportable by the broadband network and/or the interfaces between MGA 102 and the client devices), or by the MGA manufacturer (provision of the cache parameters specifying the maximum capacity of each cache and/or the speed at which data may be stored and retrieved), or by querying the various caches (available memory space at a given time).

ARC 122 processes incoming and outgoing video data in accordance with instructions defined by firmware or stored within a non-volatile memory associated with ARC 122. Such instructions would typically be defined by an MSO or MGA manufacturer, although they could also be defined by a user of MGA 102 if the proper interface was provided. This process is designed to maintain a balanced loading on content memory 124, while attempting to fulfill user-specified directives for the storage, retrieval and/or display of content. In particular, ARC 122 must utilize the available caches so as to maintain the rate and number of read and write operations to a manageable level while simultaneously managing the fulfillment of user directives. This balanced loading is essential to guarding against an unstable condition that could possibly result in the loss of data or a disk crash.

Figure 3:
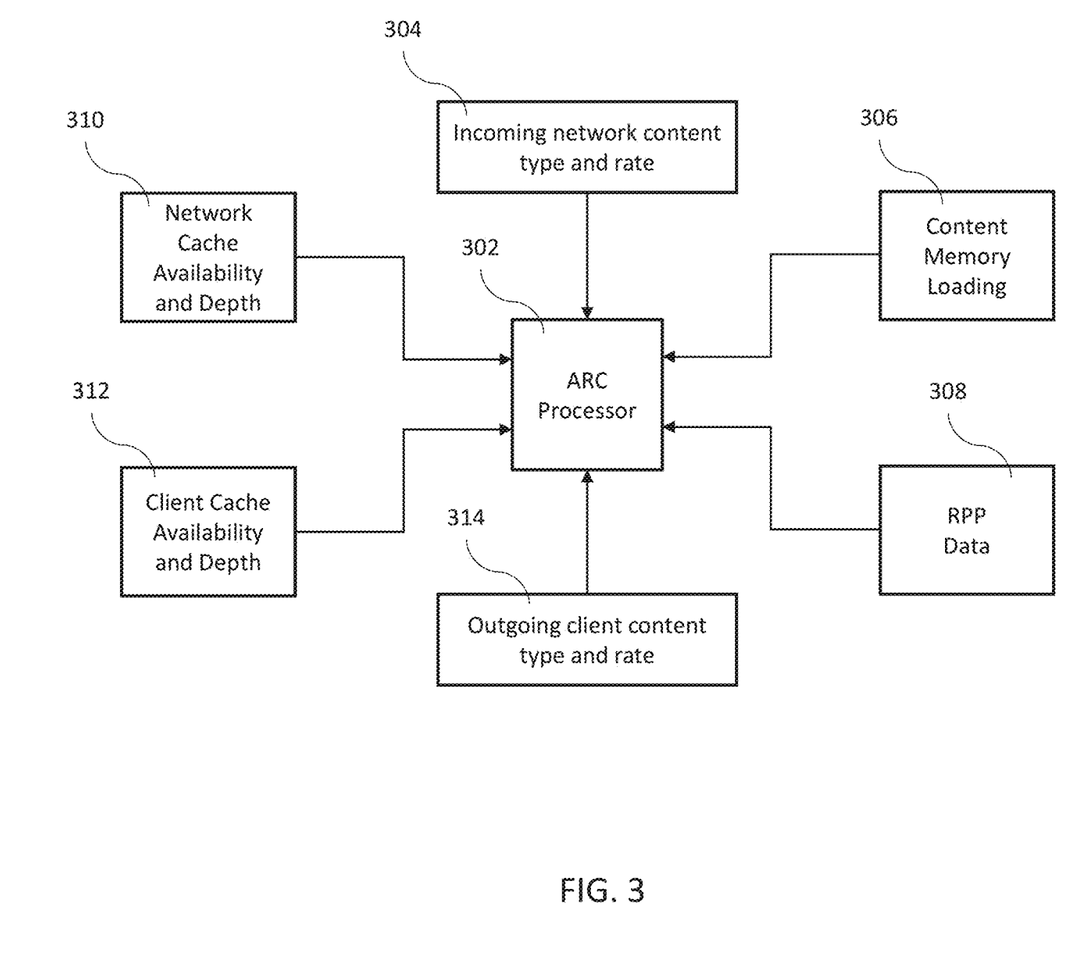
FIG. 3 is a block diagram depicting information monitored by or provided to the Adaptive Rate Controller ("ARC") within the system of FIG. 1.

FIG. 3 provides a block diagram of information monitored by or provided to the ARC Processor (138) so as to enable the execution of the aforementioned video data processing. As shown, ARC Processor 302 receives data indicative of both the type and rate of incoming network video content (304). This data, obtained from the provider of the incoming content, such as an MSO, can also include information indicative of other rates/resolutions that the particular content may be obtained at. Information indicative of the present loading upon content memory 124 (306) and available RPP data (308) is also provided to ARC Processor 302. ARC Processor 302 also receives data from the network cache(s) (310) and the client cache(s) (312). This cache data provides an indication of the present availability of cache memory, as well as the depth of the caches. Depth being a measure of the ability of a given cache to accept incoming data over a given period of time going forward. The depth may be calculated based upon the rate of incoming data to the caches versus outgoing data, the scheduled inception or termination of any incoming content streams to the network cache(s) and/or outgoing streams from the client cache(s), as well as peak and sustainable downloading rates to and from the network cache(s). The rate at which data is being stored in and retrieved from content memory 124. Factors in determining the read/write rates would include the peak read/write rates, sustainable read/write rates, scheduled content storages and scheduled content retrievals.

Figure 4:
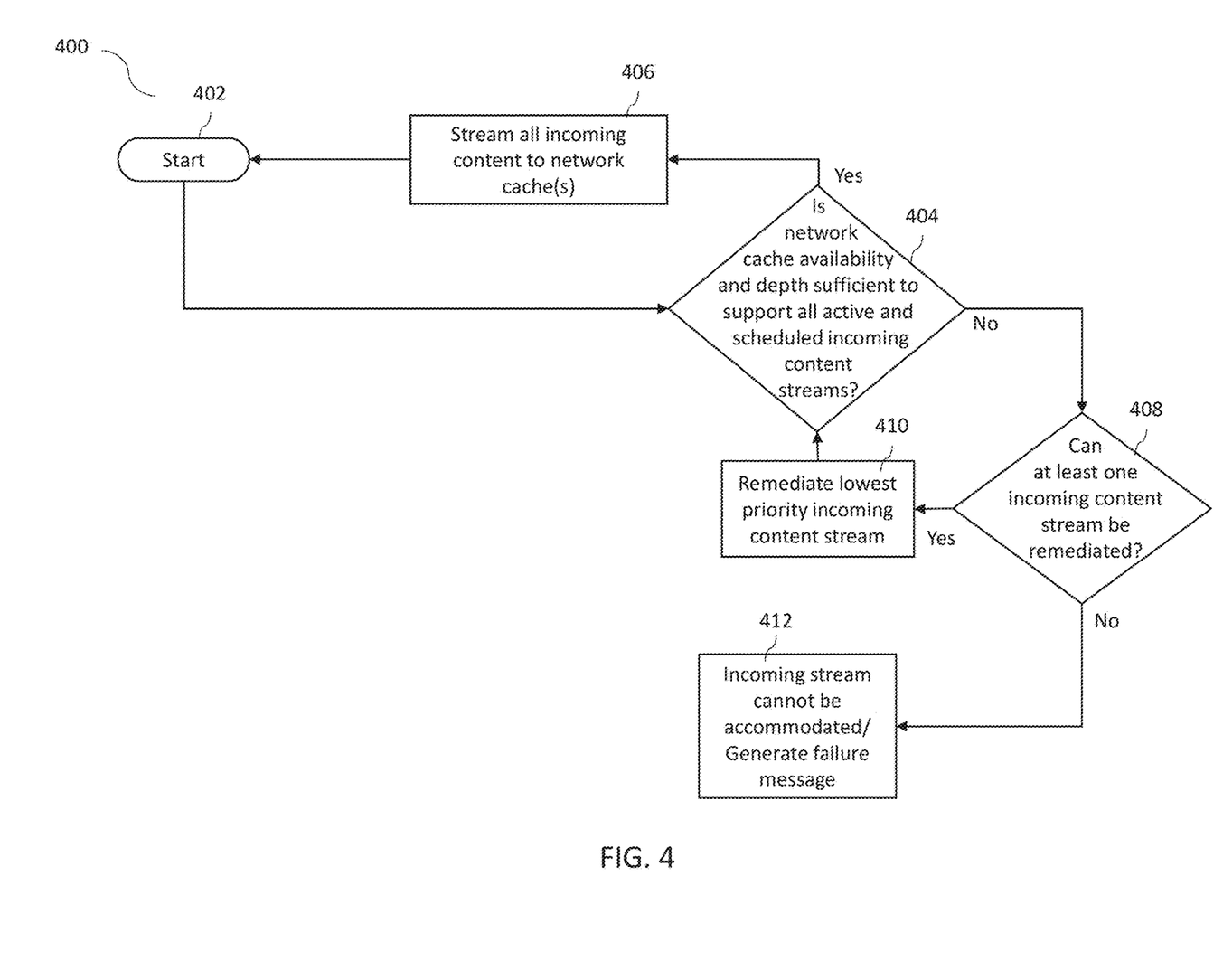
FIG. 4 is a flow diagram of a process supported by the system of FIG. 1 supporting the analysis and dynamic adjustment of incoming content streams.

FIG. 4 provides a flow diagram of a preferred process (400) supporting the analysis and adjustment of incoming content streams by the ARC (122, 302). The process initiates at step 402 and proceeds to step 404 where it tests whether the present network cache availability and depth is sufficient to support all active and scheduled incoming content streams. This determination can be made taking into account the data rates of all incoming streams, as well as scheduled initiation and/or termination of any incoming streams during a predetermined interval going forward. If step 404 yields an affirmative result, all incoming content data is permitted to stream (step 406) and the loops back to step 404. If step 404 yields a negative result the process continues with step 408 and the ARC Processor determines if there are one or more incoming content streams that can be remediated.

Remediation would be done in accordance with RPP data. For example, if a particular data stream was a live sports event, the RPP content preferences could designate such content as high priority content. If the broadcast was a local cooking program, it might be could fall under a designation of low priority content. The ARC Processor, in accordance with the particular program/algorithm it was executing could respond by obtaining a lower bitrate/resolution of the low priority program, and there by remediate the network cache issue. There can be any number of predetermined over lower priority streams. Remediation might also take the form of terminating a low priority content stream so as to ensure the retention of a higher priority stream. The ARC Processor can also be programmed to remediate or terminate a stream based on how long it has been streaming, how long it will be before the stream would normally terminate, the provider of the stream, the channel it was being received on, the resolution of the stream, etc. Following remediation, the process loops back to step 404.

If remediation is not a viable option, the process continues 412, and the ARC Processor makes the determination that the present incoming data streams cannot be accommodated. The ARC Processor could then take a predetermined course action. This could include generating a failure message and sending it to a user interface (such as a DTV, a tablet, smartphone, or virtual assistant) notifying the user of the problem. Such a message might present a list of the incoming streams and prompt the user to choose one for termination or remediation, or simply an announcement that there has been a failure. The ARC Processor could also generate a failure message for the provider of the content. That system could then respond in accordance with the provider's predetermined preferences and actions.

Figure 5:
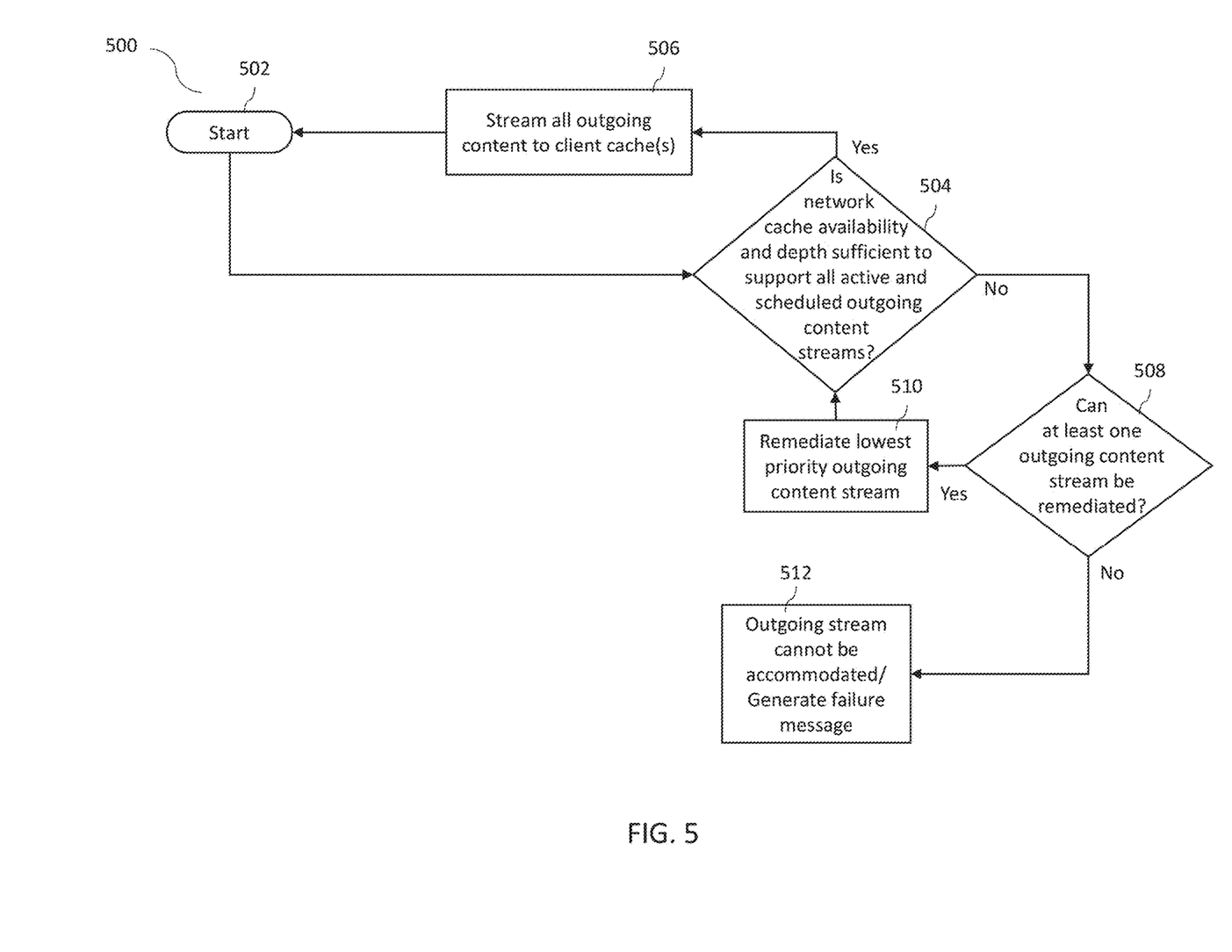
FIG. 5 is a flow diagram of a process supported by the system of FIG. 1 supporting the analysis and dynamic adjustment of outgoing content streams.

FIG. 5 provides a flow diagram of a preferred process (500) supporting the analysis of outgoing content streams by the ARC Processor (122, 302). The process initiates at step 502 and proceeds to step 504 where it tests whether the present client cache availability and depth is sufficient to support all active and scheduled outgoing content streams. This determination can be made taking into account the data rates of all outgoing streams, as well as scheduled initiation and/or termination of any outgoing streams during a predetermined interval going forward. If step 504 yields an affirmative result, all outgoing content data is permitted to stream (step 506) and the loops back to step 504. If step 504 yields a negative result the process continues with step 508 and the ARC Processor determines if there are one or more outgoing content streams that can be remediated.

Remediation would be done in accordance with RPP data, taking into account the priority of each outgoing stream. The ARC Processor, in accordance with the particular program/algorithm it was executing could respond by varying the bitrate/resolution of a stream accordingly. Remediation might also take the form of terminating an outgoing content stream. The ARC Processor can also be programmed to remediate or terminate a stream based on how long it has been streaming, how long it will be before the stream would normally terminate, the provider of the stream, the channel it was being received on, the resolution of the stream, etc. Following remediation, the process loops back to step 504.

If remediation is not a viable option, the process continues 512, and the ARC Processor makes the determination that the present outgoing data streams cannot be accommodated. The ARC Processor could then take a predetermined course action, similar to that described in process 400.

Ideally, the ARC Processor would execute processes 400 and 500 simultaneously, thereby achieving an equilibrium between the incoming and outgoing streams in a manner that would deliver an improved user experience.

Although the invention herein has been described with reference to particular embodiments, it is to be understood that these embodiments are merely illustrative of the principles and applications of the present invention. Other embodiments and variations could be implemented without departing from the spirit and scope of the present invention as defined by the appended claims. In addition, it will be understood that the various connections depicted as wired in the above embodiments could also be supported by wireless connections without departing from the scope of the invention. The ARC Processor functionality can be provided by a processor or processors local to or within an MGA, or by one or more remotely-located processors, linked via a network to the MGA. The memory supporting the storage of the video content can be a disk, a solid-state drive, cloud-based storage (in whole or in part), or any other means with sufficient capacity and speed to facilitate video storage and playback. The various caches utilized in the above-described embodiments can also be local to or within an MGA, or be remotely-located and linked via a network to the MGA. Similarly, any number of various video-capable devices could serve as client devices. These include digital televisions, tablets, smart phones, computer monitors, etc.

The invention claimed is:

1. A system for dynamic adjustment of content streaming rates, comprising:
   a first cache, having a first capacity and depth, and adapted to receive at least one stream of content from a broadband network;
   a second cache, having a second capacity and depth, adapted to provide at least one stream of content to at least one client device;
   a controller adapted to dynamically adjust at least one of the following parameters:
      a rate at which data is streamed into the first cache;
      a peak rate at which content can be written to the first cache;
      a sustained rate at which content can be written to the first cache;
      a rate at which data is streamed out of the second cache;
      a peak rate at which content can be written to the second cache; and
      a sustained rate at which content can be written to the second cache;
   based, at least in part, upon at least one of the following parameters:
      an instantaneous rate at which data is streaming into the first cache;
      an instantaneous rate at which data is streaming into the second cache;
      the first capacity and depth; and
      the second capacity and depth.

2. The system of claim 1 wherein the streaming video content is sourced from at least one of the following:
   a content delivery network;
   a streaming service; and
   a multi-service provider.

3. The system of claim 1 wherein the at least one client device comprises at least one of the following:
   a digital television;
   a computer monitor;
   a tablet; and
   a smartphone.

4. The system of claim 1 wherein the dynamic adjustment comprises at least one of the following:
   reducing a streaming rate;
   increasing a streaming rate; and
   termination a streaming rate.

5. The system of claim 1 wherein the system further comprises a memory storing rate parameters and preference data, and the dynamic adjustment is further based, at least in part, upon the stored rate parameters and preference data.

6. The system of claim 5 wherein the stored rate parameters and preference data comprises at least one of the following:
   client device preferences;
   network parameters;
   content preferences; and
   format preferences.

7. The system of claim 1 further comprising at least one user interface, and wherein the controller is further adapted to provide a message indicative of system status upon the user interface.

8. The system of claim 7 wherein the at least one user interface comprises at least one of the following:
   a digital television;
   a computer monitor;
   a tablet;
   a smartphone; and
   a virtual assistant.

9. The system of claim 1 further comprising a content storage memory, wherein the dynamic adjustment is based, at least in part upon at least one of the following:
   a peak rate at which content can be written to the content storage memory;
   the sustained rate at which content can be written to the content storage memory;
   a peak rate at which content can be read from the content storage memory; and
   a sustained rate at which content can be read from the content storage memory.

10. The system of claim 1 wherein the content storage memory comprises at least one of the following:
    a disc drive;
    a solid-state drive; and
    a cloud-based storage system.

11. A method for dynamic adjustment of content streaming rates, in a system comprising:
    a first cache, having a first capacity and depth, and adapted to receive at least one stream of content from a broadband network; and
    a second cache, having a second capacity and depth, adapted to provide at least one stream of content to at least one client device;
    the method comprising the step of dynamically adjusting at least one of the following parameters:
       a rate at which data is streamed into the first cache;
       a peak rate at which content can be written to the first cache;

a sustained rate at which content can be written to the first cache;
a rate at which data is streamed out of the second cache;
a peak rate at which content can be written to the second cache; and
a sustained rate at which content can be written to the second cache;
based, at least in part, upon at least one of the following parameters:
an instantaneous rate at which data is streaming into the first cache;
an instantaneous rate at which data is streaming into the second cache;
the first capacity and depth; and
the second capacity and depth.

12. The method of claim 11 wherein the streaming video content is sourced from at least one of the following:
a content delivery network;
a streaming service; and
a multi-service provider.

13. The method of claim 11 wherein the at least one client device comprises at least one of the following:
a digital television;
a computer monitor;
a tablet; and
a smartphone.

14. The method of claim 11 wherein the dynamic adjustment comprises at least one of the following:
reducing a streaming rate;
increasing a streaming rate; and
termination a streaming rate.

15. The method of claim 11 wherein the system further comprises a memory storing rate parameters and preference data, and the dynamic adjustment is further based, at least in part, upon the stored rate parameters and preference data.

16. The method of claim 15 wherein the stored rate parameters and preference data comprises at least one of the following:
client device preferences;
network parameters;
content preferences; and
format preferences.

17. The method of claim 11 further comprising at least one user interface, and wherein the controller is further adapted to provide a message indicative of system status upon the user interface.

18. The method of claim 17 wherein the at least one user interface comprises at least one of the following:
a digital television;
a computer monitor;
a tablet;
a smartphone; and
a virtual assistant.

19. The method of claim 11 further comprising a content storage memory, wherein the dynamic adjustment is based, at least in part upon at least one of the following:
a peak rate at which content can be written to the content storage memory;
a sustained rate at which content can be written to the content storage memory;
a peak rate at which content can be read from the content storage memory; and
a sustained rate at which content can be read from the content storage memory.

20. The method of claim 19 wherein the content storage memory comprises at least one of the following:
a disc drive;
a solid-state drive; and
a cloud-based storage system.

* * * * *